Nov. 16, 1926.  
A. MONTIGNY  
PHOTOGRAPHIC PRINTING DEVICE  
Filed May 3, 1924  
3 Sheets-Sheet 1  
1,606,955
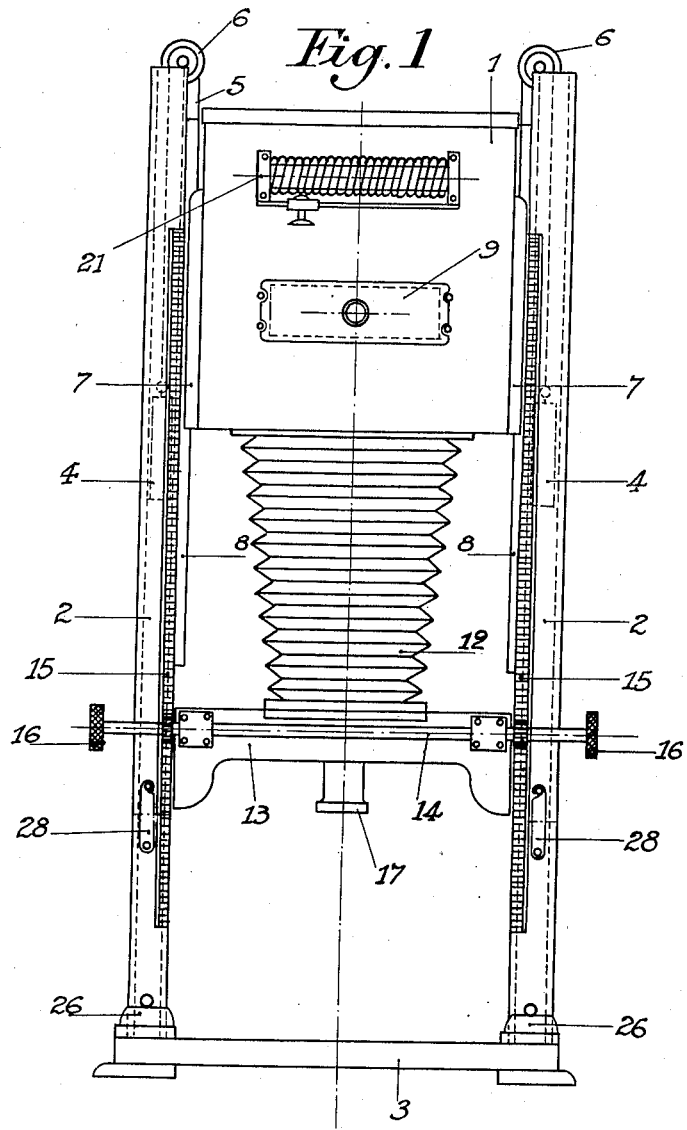
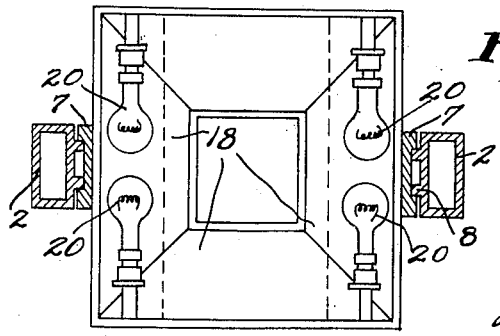
INVENTOR  
ALBERT MONTIGNY  
ATTORNEY Nov. 16, 1926.
A. MONTIGNY
PHOTOGRAPHIC PRINTING DEVICE
Filed May 3, 1924
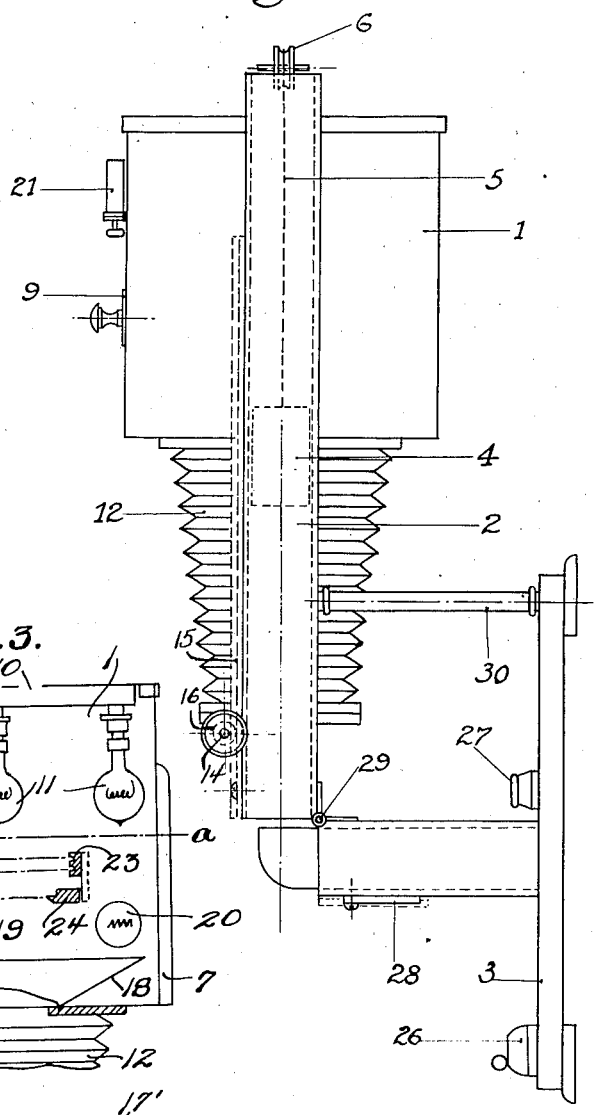
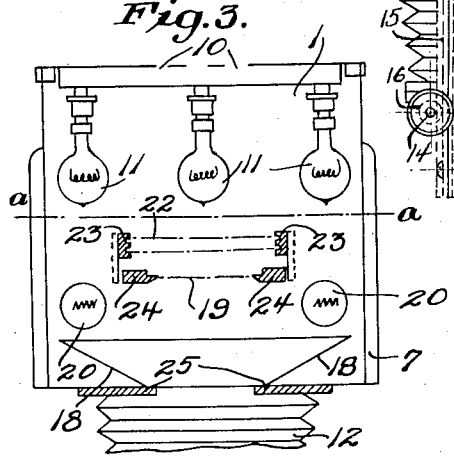
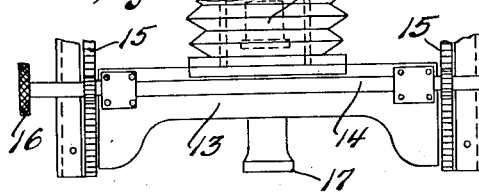
INVENTOR
ALBERT MONTIGNY.
ATTORNEY Nov. 16, 1926.

A. MONTIGNY 1,606,955

PHOTOGRAPHIC PRINTING DEVICE

Filed May 3, 1924   3 Sheets-Sheet 3

INVENTOR
ALBERT MONTIGNY
ATTORNEY.

Patented Nov. 16, 1926.

1,606,955

UNITED STATES PATENT OFFICE.

ALBERT MONTIGNY, OF BRUSSELS, BELGIUM.

PHOTOGRAPHIC-PRINTING DEVICE.

Application filed May 3, 1924, Serial No. 710,872, and in France September 28, 1923.

My present invention relates to photographic printing devices and has for its object to provide an improved device of this class enabling any transparent (glass-plate, film and the like) or opaque (photograph on paper, post-cards, hand writings, inserts and the like) original to be enlarged, reduced or simply reproduced, said device being moreover provided with particular means whereby transparent and opaque bodies may be projected simultaneously or separately.

By my improved device the operator may obtain the most beautiful printing effects by projecting the original provided with suitable vignettes to obtain a single picture without the usual demarcations. The pictures thus formed may also be enlarged or reduced as desired.

My invention has also for its object to provide certain improvements in the arrangement of the photographic lens, whereby the latter may be adjusted in any desired direction so as to obtain an exact focussing notwithstanding the warping of the posts or the wear or distortion of other parts of the apparatus. The improvement consists in using a rocking device carrying the photographic lens, adjustable in any direction and made integral with the movable part of the apparatus.

In the accompanying drawings I have illustrated one preferred embodiment of my invention, and Fig. 1 shows a front elevation of the apparatus arranged to work vertically.

Fig. 2 shows a side elevation of the same apparatus arranged to work horizontally.

Fig. 3 is a sectional elevation of the light chamber, showing more particularly the arrangement of the sources of light, reflecting mirrors, guide-ways for frames and diffusors.

Fig. 4 shows details of the movable part of the apparatus actuated by racks, and its objective carrier.

Fig. 5 is a top plan view of the light chamber or section on line $a$—$a$ in Fig. 3, showing more particularly the horizontal sources of light and combined mirrors.

Figure 6:
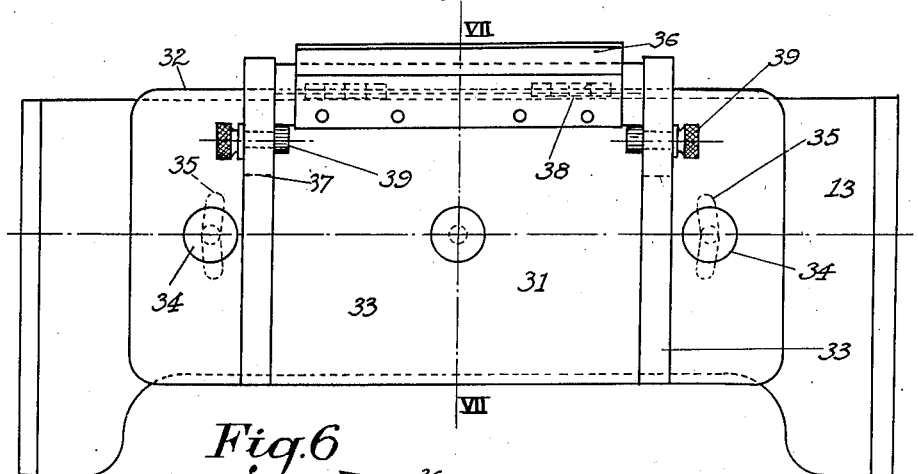
Fig. 6 is a front elevation.

The light chamber 1 is arranged to be moved as desired between two hollow standards or columns 2, 2 mounted on the screen-carrying table 3. Said movements whereby said chamber may be quickly brought to any desired position is effected by the action of balance-weights 4, slidably arranged within the columns 2. To this end said balance-weights are each attached to the end of a chain 5 passing around a grooved guide-pulley 6 and the other end of which is attached to the upper part of the rail 7 secured to the side of the chamber 1. Said rails 7 slide along guides 8 secured to the columns 2 and secure the regular movements of the chamber 1.

Provided on one side of the chamber 1 is a rectangular opening serving to receive a shutter 9 and through which a photographic frame may be introduced into the chamber. Ventilating ports 10 are provided in the top of the chamber 1 to which lamps 11 are attached, the number of said lamps varying according to the surfaces to be lighted and the size of the apparatus.

Said chamber 1 is connected by an extensible connection or camera 12 to a movable part 13, on which is arranged a horizontal shaft 14 carrying two toothed pinions meshing with racks 15 secured to the columns 2. It will be seen that said shaft 13 may be rotated by means of milled discs 16, whereby the movable part 13 will be moved along the racks 15 for the purpose of quickly and correctly adjusting the device. The photographic lens 17 may be arranged at the outside or the inside at 17' of the extensible connection (Fig. 4) as desired, according as said lens has a long or short focus and according to the relation of enlargement or reduction desired.

The projection of transparent bodies will be obtained by the lamps 11, the rays of which will be reflected by mirrors 18 arranged in inclined positions on the bottom of the chamber 1 as shown in Fig. 3. Therefore the device also enables opaque bodies (vignettes or the like) to be lighted. said bodies being placed below the original to be projected (Fig. 3).

Should however the lighting of the opaque body (vignette and the like) require a longer time of exposure than the time corresponding to the production of a good print of the transparent body, I may also make use of the lamps 20 (Fig. 3), the luminous intensity of which is adjustable as desired through the agency of a rheostat 21, shown in Fig. 1. It will be seen that by this method it will be possible to very easily project opaque and transparent bodies at the same time, which heretofore could only be obtained by means of two simultaneous lightings, always adapted to vary and produce irregularities in successively produced prints.

The diffusion of the light produced by the lamps 11 will be obtained by means of diffusors 22 held by two guide-rails 23. The sizes of said diffusors must substantially exceed those of the transparent bodies to be projected and arranged in the photographic frame.

If it is desired to merely project opaque bodies, I preferably use only the sources of light 20, the intensities of which may be varied by acting on the rheostat 21. By this device the operator may in certain cases avoid the use of diaphragms, whereby pictures showing exaggerated contrasts are sometimes obtained.

The sources of light 20 are arranged above the level of the bodies to be projected for the purpose of protecting the same from the heat produced by oxid sources.

Two opaque screens 25 are arranged so as prevent direct or indirect rays of light from striking the lenses of the objective 17 (particularly if the latter has a short focus), whereby undoubtedly prints would be obtained which are not clear and wherein the grades of the bodies submitted to projection are not respected.

The various manipulations herein described are obtained with the assistance of two switches 26 and two junction boxes 27 (Fig. 2) arranged on the right and left hand sides of the screen carrying table.

If it is desired to obtain enlargements or projections of larger proportions than those admissible by the arrangement of the screen 3 (Fig. 1), it will be easy to turn the latter sideways and arrange the apparatus for horizontal work (Fig. 2), in which position the scope of action thereof will be unlimited. To this end the hooks 28 which hold the sections of columns 2 alined in vertical positions will be disengaged and the screen-carrying table pivoted around the hinges 29 (Fig. 2) until the upper sections of the columns 2 rest on the posts 30 arranged to this end on said table.

The primary object of the invention above described is to provide means whereby perfectly identical series of reproductions may be obtained, if it is desired to simultaneously reproduce a transparent body, and an opaque body or mask. The apparatus described enables a transparent body and an opaque body or mask to be reproduced in one operation, a first lighting circuit (lamps 11) being used for lighting the transparent body and a second circuit (lamps 20) serving to light the opaque body. However in practice it has been found that the existence of two distinct circuits has sometimes certain objections. Thus if it is desired to produce a number of identical copies, a great difficulty arises from the fact that the time of exposure of the opaque body is not always necessarily the same as the time of exposure of the transparent body. Hence for each reproduction the operator is to close the circuit of lamps 11 by one hand and the circuit of lamps 20 by the other hand, count two seconds for instance, open the circuit 20, then again count two seconds and open the circuit 11. It is obvious that in this way it will be very difficult to obtain a number of quite identical copies, even with a very skillful operator. Another objection is in the fact that possibly the operator has both hands occupied. These objections will be easily and practically avoided by combining the two circuits of lamps 11 and lamps 20 respectively to a single one by means of a contact plug of the usual type. Said plug branched—in cases where the time of exposure must be of a different length—on the circuit of lamps 20 enables both circuits, owing to the adjusting rheostat 21 (Fig. 2) to be closed and opened simultaneously by means of a single switch. The modus operandi is as follows:

The two circuits being united by the insertion of the plug into a corresponding socket, the rheostat 21 will be adjusted so that the lighting furnished by the lamps 20 will be such that for a time of exposure equal to the time of exposure required by the desired reproduction of the transparent original, the opaque body will be reproduced as desired. This adjusting will be obtained optionally and requires but little practice. Then the switch of the single circuit will be closed, the time necessary for the reproduction of the transparent original will be counted and the circuit broken. In this way I may produce any desired series of quite identical copies, the operator having at the same time one hand free.

Figure 7:
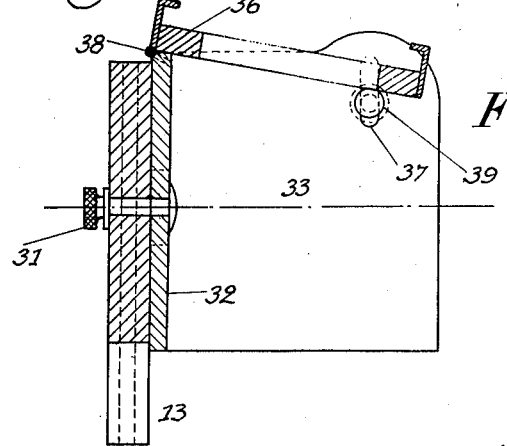
Fig. 7 is a vertical section on line VII—VII in Fig. 6.
Figure 8:
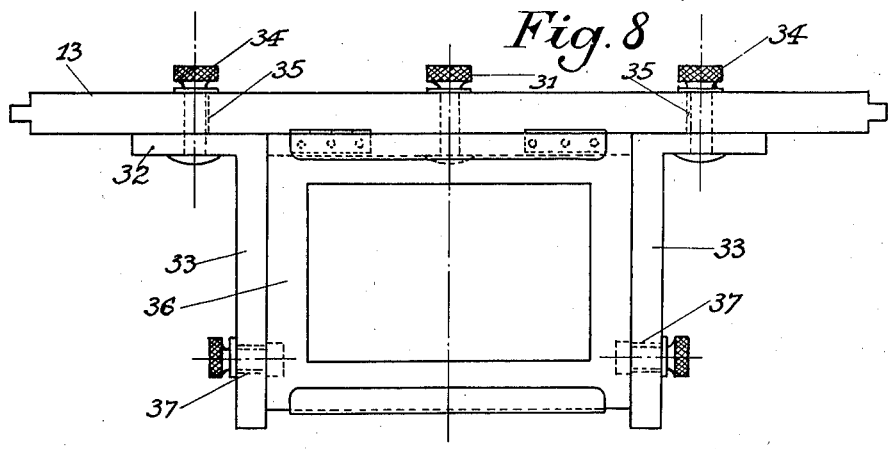
Fig. 8 is a plan view corresponding to Fig. 6.

Referring now to the arrangement shown in Figs. 6, 7 and 8, it will be seen that the movable part 13 connected to the expansible connection 12 has secured to it by means of a central screw a three sided box, the wall 32 of which extends somewhat beyond the sides 33. Said wall 32 is adapted to be rotated about the screw 31 and locked in any adjusted position by means of milled screws 34 extending through the part 13 and slots 35 in the wall 32. Of course said slots 35 are arched. The arcs being struck from the screw 31 as a centre. Pivotally connected to the upper rim of the wall 32 by means of hinges 38, pivot-pins or the like is an objective carrying frame 36 (shown without photographic lens), adapted to swing between the sides 33, each of which has an arched slot 37 struck from the connection 38 as a centre. Projecting into said slots 37 are pins or milled screws 39 which may be locked in position by screwing home the nuts thereof, said screws supporting the frame 36 beyond the sides 33. Therefore the frame 36 and also the objective may be adjusted in any direction by the combination of the screws 34 and 39.

It will be understood that for adjusting purposes I may use screws located at other places or fixed screws which are merely adjustable by rotation in either direction (micrometric screws). This latter arrangement will even be preferable for the quickness and easiness of adjustment, particularly for enlarging purposes, when the objective is located rather high.

Having now fully described my said invention, what I claim and desire to secure by Letters Patent, is:

1. In a photographic printing device, a casing, means arranged intermediate the end walls of the casing to receive a photographic frame with the object to be reproduced, said means being spaced from the walls of the casing to provide a passage between such walls and said means, a source of illumination arranged in rear of said frame receiving means, mirrors arranged in front of said frame receiving means, and inclined to reflect the light rays from said light source on to the front of the object in the frame receiving means and an additional light source arranged in advance of the frame receiving means to directly illuminate the front of the object in such frame receiving means.

2. In a photographic printing device, a casing, means arranged in said casing for receiving a photographic frame with a transparent photograph and an opaque body to be reproduced simultaneously, said means maintaining the frame in spaced relation to the walls of the casing, a series of electric lamps above said means to illuminate by direct light the transparent photograph, inclined mirrors or reflectors on the bottom of said casing, under said frame, and so disposed as to project towards the lower face of said frame the light of the lamps passing between said frame and the walls of the casing, and to illuminate the opaque body by reflected light, and a photographic camera operatively connected to said casing.

3. In a photographic printing device, a casing, means arranged in said casing for receiving a photographic frame with a transparent photograph and an opaque body to be reproduced simultaneously, said means maintaining the frame in spaced relation to the walls of the casing, a series of electric lamps above said means to illuminate by direct light the transparent photograph, inclined mirrors or reflectors on the bottom of said casing, under said frame and so disposed as to project towards the lower face of the frame the light of the lamps received through the space between said frame and the walls of the casing and to illuminate the opaque body by reflected light, a series of auxiliary electric lamps under said frame to reinforce the illumination of the opaque body by direct light, in cases where the reflected light is not sufficient to have the opaque body reproduced in the same period of time as the transparent photograph, a rheostat whereby the intensity of said auxiliary lamps may be adjusted in order to have both bodies reproduced in the meantime, and a photographic camera operatively connected to said casing.

4. In a photographic printing device, a base, spaced parallel standards rising from the base, a chamber carried by and adjustable on the standards, means in the chamber for receiving the object to be reproduced, lighting means within the chamber, a photographic camera mounted in said standards and operatively connected to the chamber, a frame for carrying the lens of said camera, said frame including an element mounted for limited rotative movement relative to the camera, a lens carrying member hingedly connected to said element, means whereby the element may be fixed in rotative adjustment to the camera, and means whereby the member may be fixed in swinging adjustment to the element.

5. In a photographic printing device, a casing, means arranged in said casing to hold a photographic frame, a light source at one side of said means, a reflecting source at the other side of said means, the parts being in such relative positions as to permit the light from said light source to pass through and also around the object in the frame, so that the light passing around such object may be reflected by the reflecting source onto that surface of the object remote from the light source.

In testimony whereof I have hereunto set my hand.

ALBERT MONTIGNY.